(12) United States Patent
Tripp

(10) Patent No.: US 8,031,402 B2
(45) Date of Patent: Oct. 4, 2011

(54) SPLIT SCREEN DISCRETE VIEWING METHOD

(76) Inventor: David M. Tripp, Aiken, SC (US)

( * ) Notice: Subject to any disclaimer, the term of this patent is extended or adjusted under 35 U.S.C. 154(b) by 650 days.

(21) Appl. No.: 12/139,191

(22) Filed: Jun. 13, 2008

(65) Prior Publication Data

US 2008/0310018 A1 Dec. 18, 2008

Related U.S. Application Data

(60) Provisional application No. 60/943,941, filed on Jun. 14, 2007.

(51) Int. Cl.
*G02B 27/28* (2006.01)
(52) U.S. Cl. .................. 359/490.01; 359/488.01; 353/20
(58) Field of Classification Search .................. None
See application file for complete search history.

(56) References Cited

U.S. PATENT DOCUMENTS

| | | | | |
|---|---|---|---|---|
| 2,832,821 A * | 4/1958 | Du Mont | ....................... | 348/835 |
| 4,562,463 A * | 12/1985 | Lipton | ............................ | 348/56 |
| 4,879,603 A * | 11/1989 | Berman | ........................ | 348/832 |
| 5,162,897 A * | 11/1992 | Jitsukata et al. | ................ | 348/58 |
| 5,956,180 A | 9/1999 | Bass | | |
| 5,963,371 A * | 10/1999 | Needham et al. | ............. | 359/464 |
| 2001/0015753 A1 | 8/2001 | Myers | | |
| 2004/0135740 A1* | 7/2004 | Sato et al. | ......................... | 345/6 |
| 2008/0158095 A1* | 7/2008 | Neidrich et al. | ................... | 345/6 |
| 2010/0130280 A1* | 5/2010 | Arezina et al. | ................... | 463/20 |

* cited by examiner

*Primary Examiner* — Arnel C Lavarias
(74) *Attorney, Agent, or Firm* — Samuel Alexander Long, Jr.

(57) ABSTRACT

An apparatus and method for allowing multiple individuals to view discrete images while remaining in close proximity to each other. It encompasses a split screen polarized lens, with alternate polarization portions, fitting over a viewing monitor and pairs of corresponding polarized glasses. Each pair of polarized glasses matches a portion of the screen lens with the same polarization so that the human viewer wearing vertically polarized glasses may only view the vertically polarized portion of the screen and the human viewer wearing horizontally polarized glasses may only view the horizontally polarized portion of the screen.

2 Claims, 6 Drawing Sheets

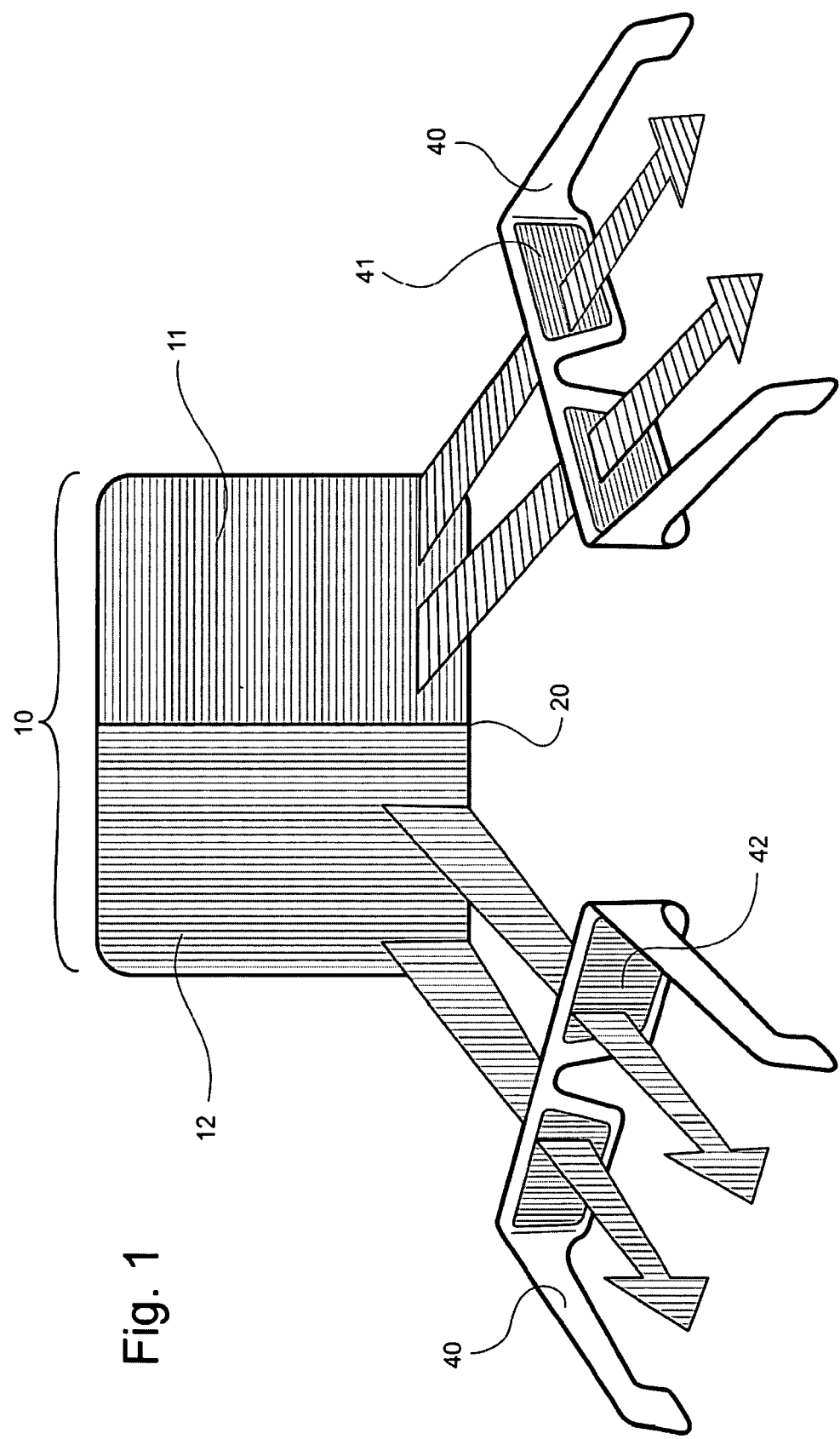

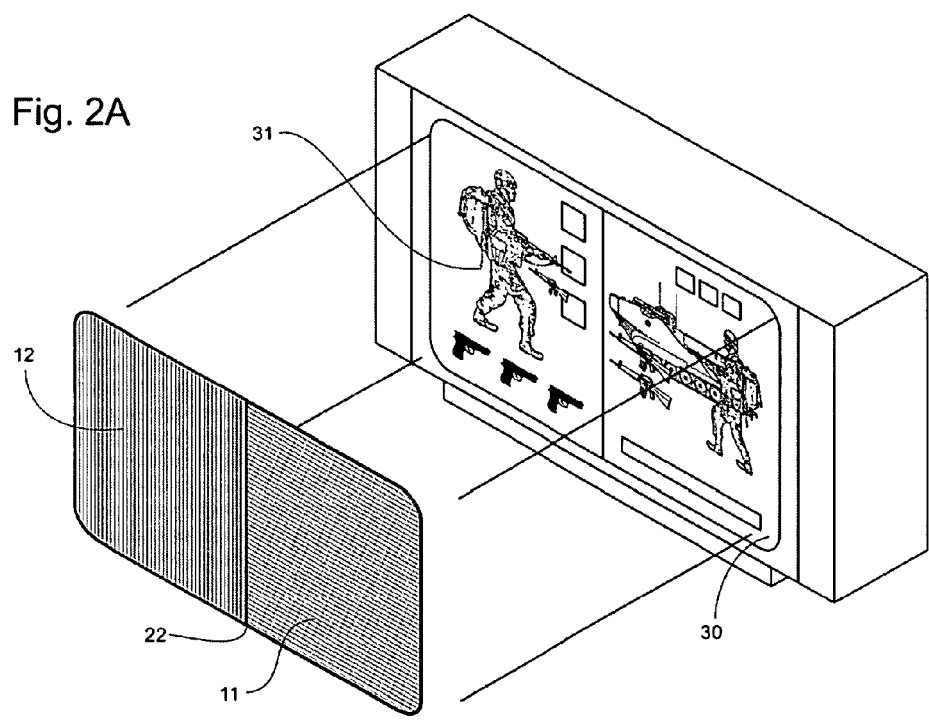

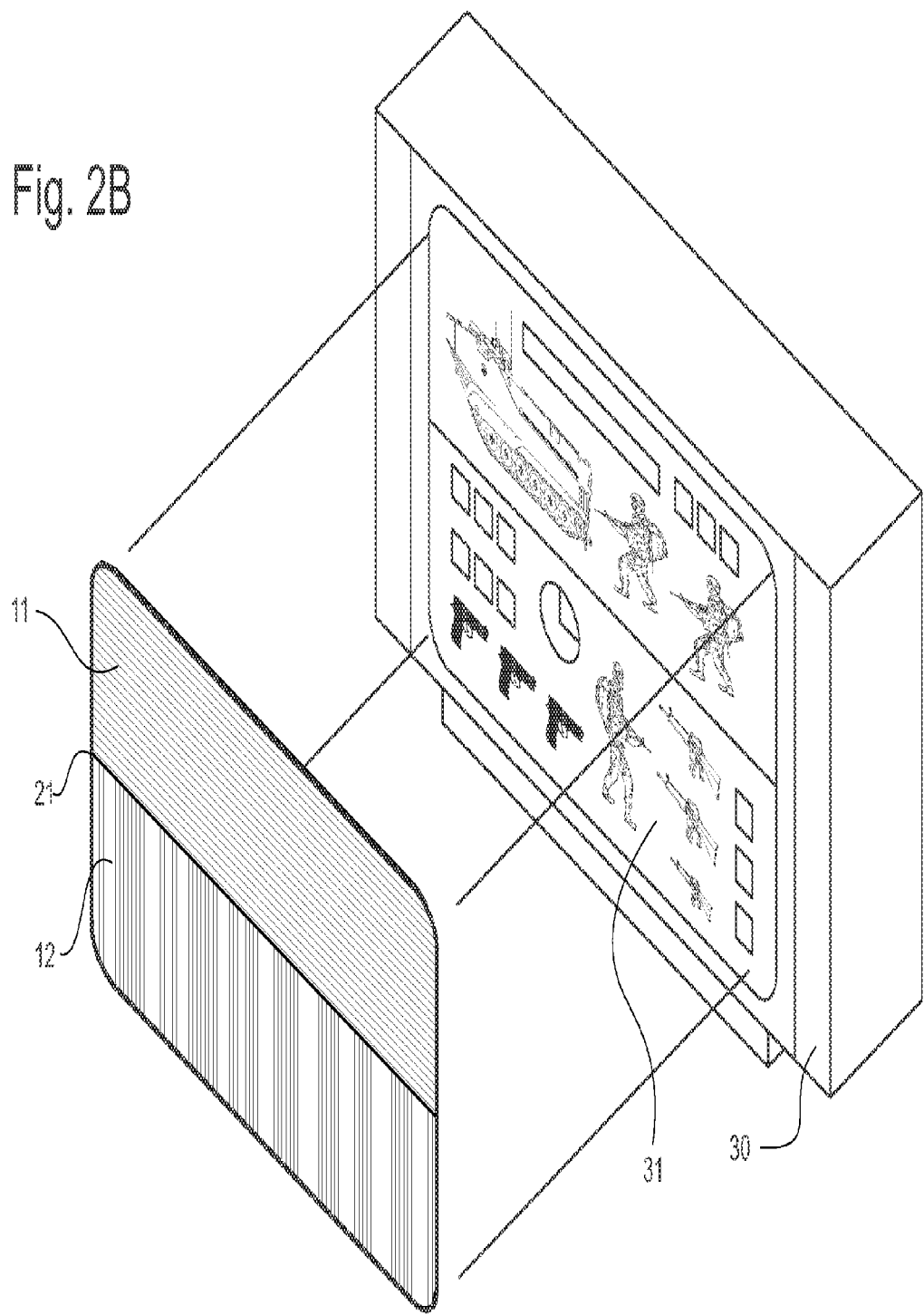

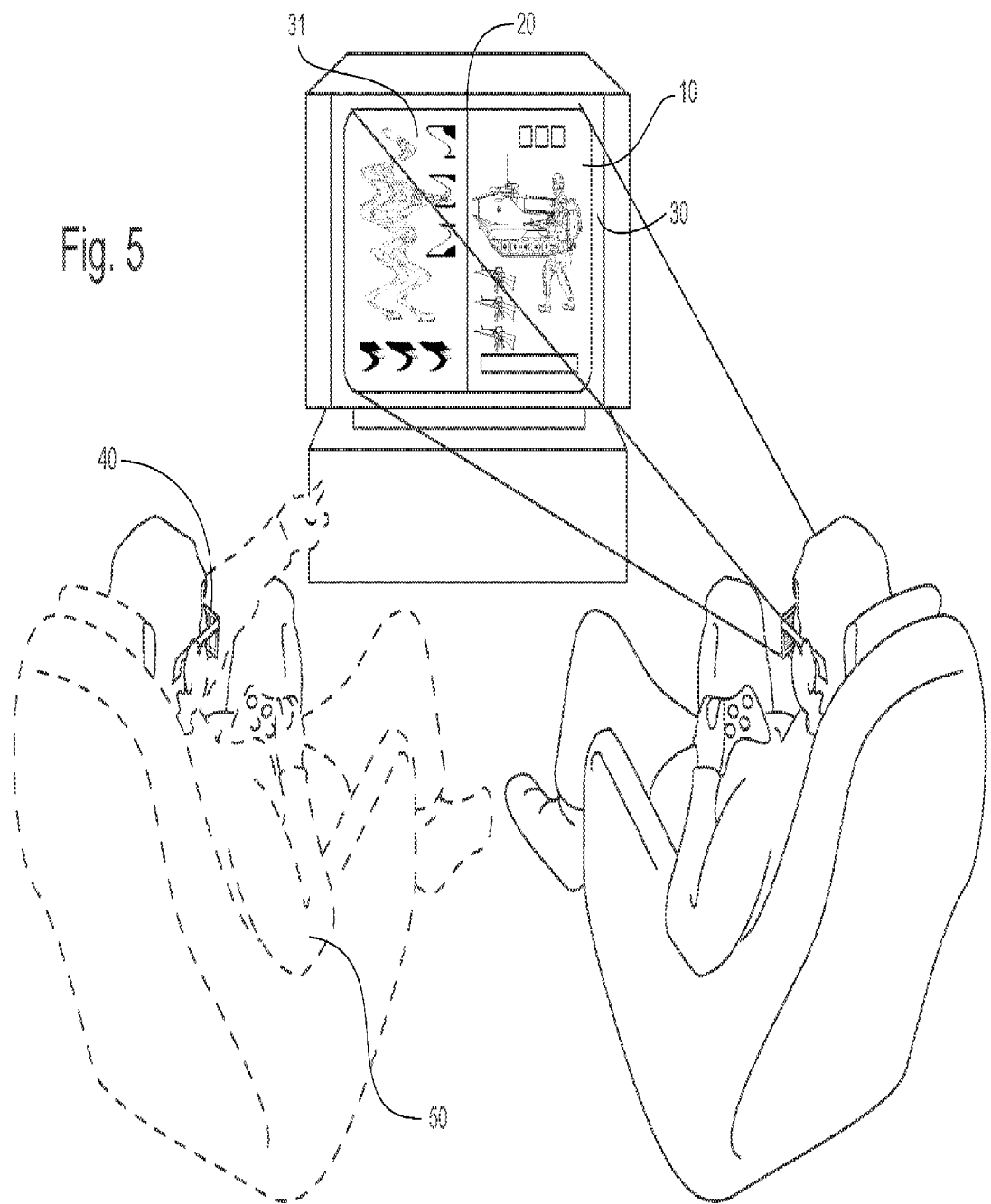

SPLIT SCREEN DISCRETE VIEWING METHOD

RELATED APPLICATIONS

This application claims priority for US Provisional Patent Application having Ser. No. 60/943,941.

FEDERALLY SPONSORED RESEARCH OR DEVELOPMENT

Not applicable.

REFERENCED OR INCORPORATED MATERIAL

Not applicable.

BACKGROUND OF INVENTION

The present invention relates to the field of optical viewing systems and, in particular, to the viewing systems that display images in a "split screen" mode where it is desirable for multiple persons to discretely view portions of a screen. A split screen may be a single screen with the image divided or it may be multiple display apparati closely situated.

The current state of the art of video monitors consists of various cathode ray tube (CRT) displays, liquid crystal displays (LCD), plasma displays, digital light projection (DLP) displays, and many other types of displays and projections. The CRTs, in particular are quite old in the art while the other types are of newer origin.

Often, in the art of video viewing, it is desirable to have multiple viewers simultaneously view a split screen. Further, it is often preferable for these viewers to each only view a portion of a split screen directed to them. These situations are known in the art as "split screen viewing." Typically the screen will be divided into two parts either vertically or horizontally. Similarly, multiple screens may be horizontally aligned side by side, stacked vertically one on top of the other, or otherwise arranged in close proximity.

Many situations require the splitting of a screen and the segregation of viewers. For instance, doctors conducting a medical procedure may view a monitor with a split screen but at points during the procedure may need focus only on a portion of the screen. In such situations, the other, temporarily superfluous, half of the screen could be a distraction to the doctor. If the doctor could view only the relevant portion, he could be more efficient. Similarly, during flight and flight training, there exist times when aircraft pilots may benefit from limiting their vision to one set of screens versus contending with a multitude of superfluous split screens or sets of screens.

Similarly, in the field of television and video entertainment it is often the case that multiple persons wish to view separate programming in the same physical proximity as each other. To this end, many televisions offer a feature known as picture-in-picture where video images from different sources are shown on the television at the same time. Also, it is common for more than one video monitor to be placed in a room at the same time for viewing different programming. However, there is a recurring problem in the art where program viewers of one video image are distracted by the additional programming images.

Another common situation involving split screen viewing occurs in the video gaming community. In these situations, it is quite common for games to allow for multiple players on a single computer or gaming console. In this way, video gaming has been a social experience since its inception. Players build comradery through such personal interaction in addition to virtual interaction. These are experiences that either do not occur or are greatly weakened when players participate in remote locations.

These multiplayer features of video gaming are facilitated through multiple player input devices. Such games cover the spectrum of the gaming community from sports games, to strategy games, to action games, to fighting and war games, to simulation games, and to racing games. Moreover, most of these games are competitive such that each of these players is competing against each other. The principle image is of players crowding around a television screen, an arcade console, or a computer screen.

In the multiplayer video game situation outlined above, the split screen mode presents several problems. First, having multiple screens creates distractions. In what may be the most common situation player one, viewing the first half of a screen, is distracted by the second half of the screen just as player two is distracted by the first half of the screen. Additionally, with respect to the competitive games, players are disclosing to their opponent "privileged" information such as their location on a gaming map or their avatar's fictional health points. Such distractions and disclosures limit the effectiveness of split screen gaming.

To overcome this problem, there has been some suggestion that players physically distance themselves and view separate screens. For instance, some gamers place different monitors in separate rooms or on opposite sides of a room. However, such solutions ring hollow because they dissipate the social experience of multiplayer gaming.

Thus, there is a need in the art for a device which facilitates split screen viewing whereby viewers need not be physically segregated in order to view discrete portions of video display.

SUMMARY OF THE INVENTION

It is the object of the present invention to provide an apparatus and method that facilitates multi-person viewing of discrete portions of a video display, namely split screen viewing, while allowing all viewers to remain in close physical proximity to each other as well as of the video display. In the preferred embodiment of the present invention, this concept is achieved by utilizing polarized light. Light emitting from a split screen is first polarized by the apparatus into two or more discrete polarization fields such as the case where the light from the respective fields is polarized in either vertical and horizontal planes or in other ways. The viewer then wears corresponding polarized glasses which allow the viewer to only see the portion of the screen which has been similarly polarized. For instance, a viewer wearing horizontally polarized glasses would only be able to visually discern that portion of the screen emitting from the display that has been horizontally polarized. Similarly, a viewer wearing vertically polarized glasses would only be able to visually discern that portion of the screen emitting from the display that has been vertically polarized. Other methods of polarization can be used in situations involving more than two discrete viewing portions of the split screen devices. As used here, the term glasses is broad and includes, but is not limited to, frames and lens of any shape and configuration including lens material without a frame as well as lens covers or coatings for regular glasses.

By utilizing polarized light as a visual segregation tool, the independent viewers can remain side by side in close physical proximity. Surgeons do not have to be on opposite sides of an operating room and video game players do not have to be on opposite sides of a game room or in different rooms. Rather, because they each only see the portion of the screen or screens intended for them, they are no longer restricted in their viewing locations in order to avoid distraction.

Importantly, while the user's vision of the split screen is limited to their respective portions, they are still free to observe all their real world surroundings based on the natural ambient light that is non polarized light. This feature means that, for instance in the video gaming context, the players can still see each other as well as other objects of interest in the room except the portion of the split screen that "belongs" to their opponent or opponents. Thus, they are free to interact with each other, enjoy food and beverage, and view their portion of the split screen.

Additionally, the present invention can be characterized by its versatility, its simplicity, its structural integrity, and its economy. The versatility is typified by the vast number of arenas in which it may be employed. The apparatus may be used with many different types of displays including CRTs, plasma, DLPs and many more. Moreover, the apparatus may be sized to fit any size display from very small handheld type displays to large theater displays and the many sizes in between.

The implementation of the apparatus into many common applications is rather simple. The simplicity element is critical because it can be applied to many existing systems without expert installation or large equipment overhauls. Rather than buying additional display devices at considerable costs or hiring expensive experts to install complicated hardware, the user need only apply the present apparatus. In a typical application, a video game enthusiast can apply an external split polarization lens, made from a variety of different materials, directly over the video screen. Then, multiple players don their respective glasses for viewing their respective split screen portions.

The apparatus is characterized by its structural integrity because it is designed to take abuse that frequently occurs in situations involving multiparty viewing. The lens can be applied and removed repeatedly without compromise to its function or the display apparatus. Moreover, the viewer glasses can be used and reused repeatedly without compromise.

The economy of the apparatus is particularly important as it negates the requirement to purchase expensive equipment. Moreover, there are no complex parts and the volume of space occupied by the apparatus is comparably small. Indeed, in some embodiments, the apparatus may be rolled up or otherwise tightly compressed for storage or transport. Additionally, the apparatus may be efficiently manufactured and distributed to end users.

BRIEF DESCRIPTION OF THE SEVERAL VIEWS OF THE DRAWINGS

FIG. 1 is a front view representing how horizontal linearly polarized light is visible through horizontal linearly polarized glasses and how vertical linearly polarized light is visible through vertical linearly polarized glasses.

FIG. 2A is a perspective view depicting how the polarized screen lens fits over a vertically split screen monitor.

FIG. 2B is a perspective view depicting how the polarized screen lens fits over a horizontally split screen monitor.

FIG. 5 is a perspective view depicting how a viewer wearing horizontally polarized glasses may only view the horizontally polarized portion of the screen.

DETAILED DESCRIPTION

Figure 3:
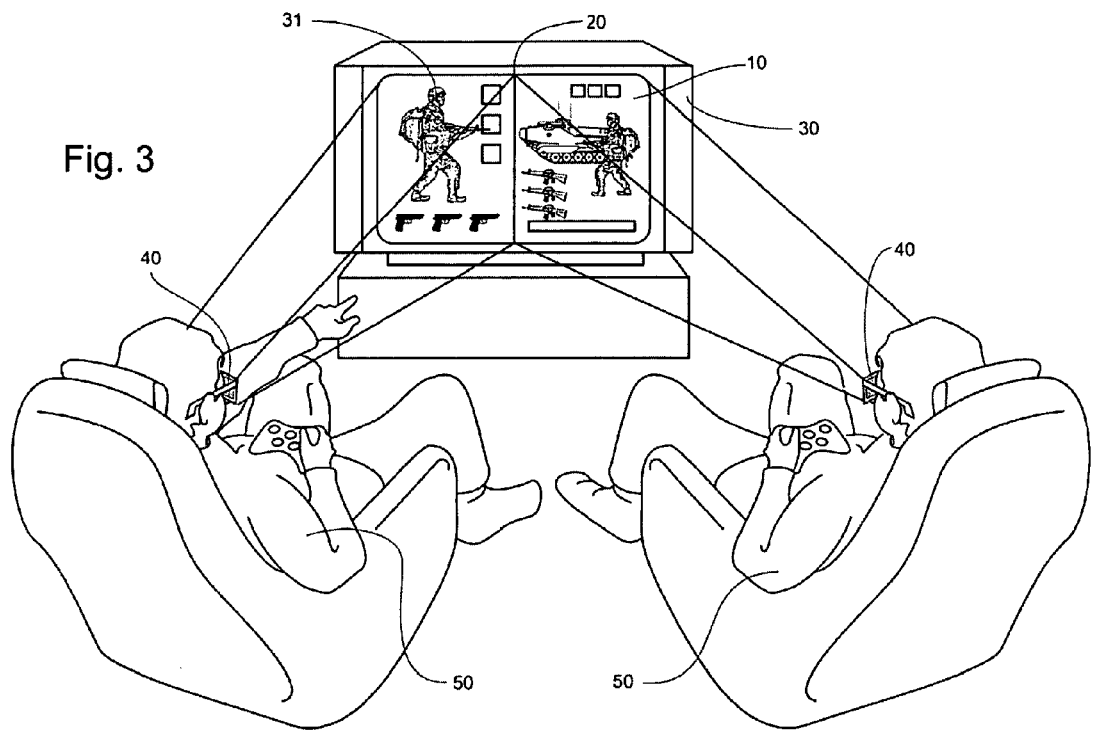
FIG. 3 is a perspective view representing the typical video game players viewing their respective portions of the screen through their respective viewing glasses.
Figure 4:
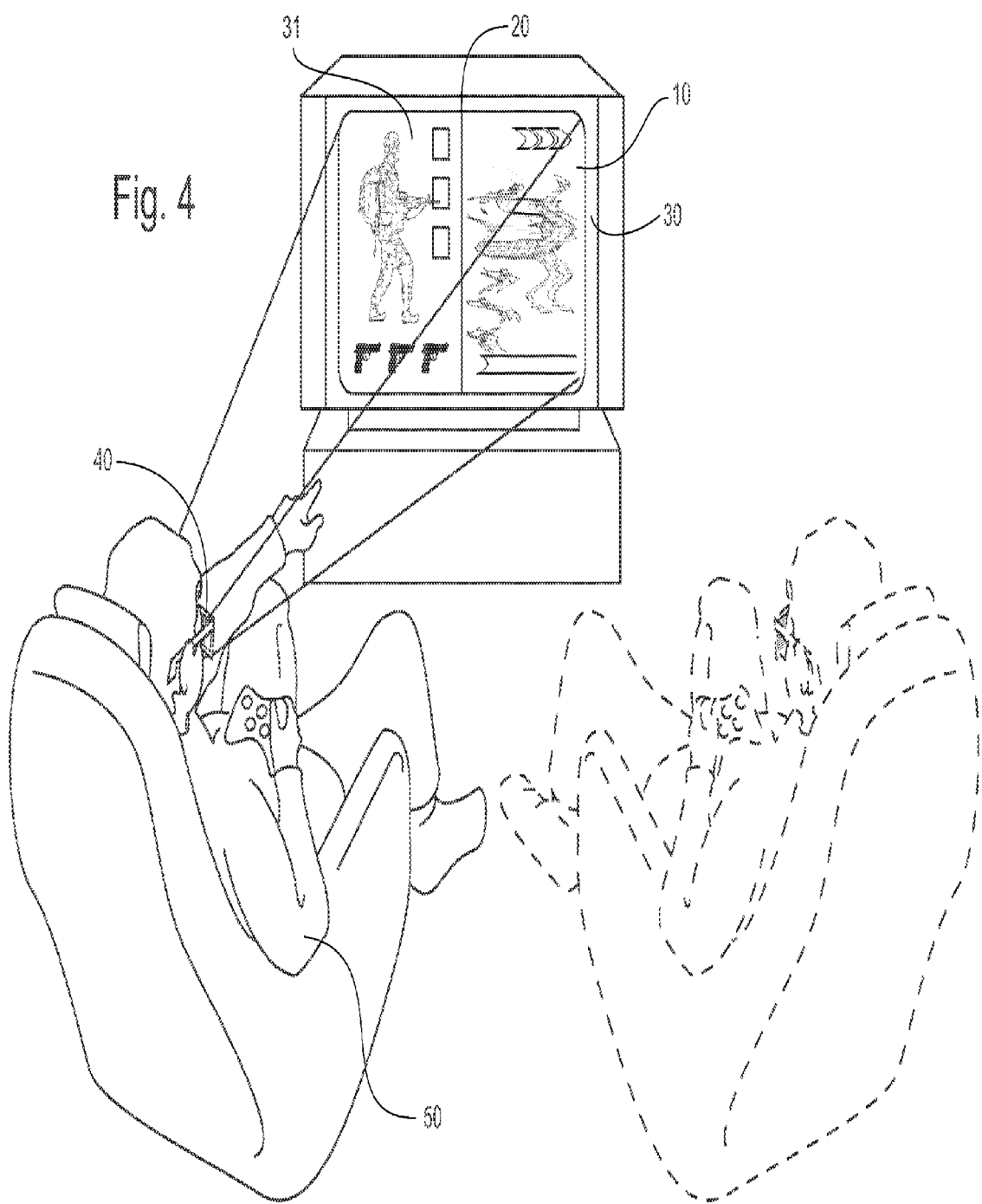
FIG. 4 is a perspective view depicting how a viewer wearing vertically polarized glasses may only view the vertically polarized portion of the screen.

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

The present invention relates to an apparatus and method for allowing multiple individuals to view discrete images on a split screen while remaining in close proximity to each other. In one embodiment, the apparatus comprises a screen lens (10) and at least one pair of eye glasses (40).

In this embodiment, the screen lens (10) is divided into at least two fields (11 & 12) with each of the fields having a polarization that is different from the polarization of the other field. Typically this lens (10) is constructed of polarized film which allows for a high transmission of light. However, the material comprising the lens (10) can be selected from a variety of different materials including glass, plastic, carbon composites, films, or any other translucent material through which light may pass and be polarized.

In the simplest implementation the screen lens (10) is divided into two linearly polarized fields (11 & 12) that are perpendicular to each other and divided along the line of the respective polarization fields. This line is known as the dividing line (20), and, typically, the user will align the dividing line (20) with the split screen division line separating one video image (31) from another. Depending on the particulars of the split screen, that is whether the split is horizontal (21), vertical (22), or at some other angle or mode of polarization, the user may rotate the screen lens (10) by the corresponding angle so that the dividing line (20) matches the split screen division line.

The screen lens (10) also comprises a means of attaching the lens to the split screen. In alternate embodiments, the lens may be fixedly attached or removably attached by various means. This means can be achieved via many different utilities including various clips, hook and loop fasteners, intrinsic static cling properties, magnets, adhesives, threading, or any other means that allows the lens to be removably attached to the monitor.

Paired with the screen lens are viewing glasses (40). These viewing glasses (40) are polarized to correspond with matching polarized field. Typically there is at least one pair of viewing glasses corresponding with each polarized field of the screen lens. Thus, in the typical arrangement where the screen lens is split into two polarized fields having polarizations perpendicular to each other, there will also be two pair of viewing glasses, one having horizontal polarization (41) and the other having vertical polarization (42). For each pair of viewing glasses (40), the individual lenses of a particular pair will have the same polarized filter.

With regard to the structure of the glasses (40), the present invention contemplates any means which effectively and removably allows the user to wear the glasses. In the preferred embodiment, these are glasses which resemble ordinary eye glasses worn by near and far sighted humans. However, they may just as easily have paper or metal frames or they may resemble goggles or protective eyewear. Indeed, when employed in the field of action video games (31) requiring physical movement of the user more secure eyewear that stays in place during movement may be necessary. Likewise, the invention contemplates various types of add-ons or clip-on eyewear which attach onto existing eyewear for those requiring corrective lenses.

There is also included a means of visually discerning which pair of viewing glasses (40) belong to which polarized screen field. This means could be a numbering system, a color coding system, or any other visual indication that alerts the user as to which pair of glasses is associated with a particular polarized field of the lens screen.

Another embodiment of the invention contemplates a method of discretely viewing portions of a video screen (30). There are first provided polarized glasses (40) and a split screen (10) whose output is displayed, projected, or otherwise filtered so as to be differentially polarized in more than one discrete portion (11 & 12). The video image viewer (50) or viewers then choose which pair of glasses (41 or 42) to wear depending on which portion of the screen (11 or 12) he or she wishes to view. Finally, the viewers don their respective glasses (40) and view their respective portions of the split screen (10) without interference or distraction from the other portion or portions of the split screen whose polarization does not match that of their glasses.

What is claimed is:

1. A method of discretely viewing a split screen comprising the steps of:

first, providing a screen lens having a plurality of polarized fields divided by a dividing line or a plurality of dividing lines;

second, providing a video monitor, or a plurality of video monitors, with split screen video programming;

third, placing the screen lens over a monitor surface and aligning the dividing line or dividing lines of the screen lens with a line or lines separating a plurality of respective portions of the split programming;

fourth, removably fixing the screen lens in place;

fifth, providing a plurality of eye glasses, each having a lens polarization corresponding to one of the polarized fields of the screen lens provided in step one;

sixth, placing one pair of said plurality of eye glasses on a face of each user, said pair corresponding to one of the fields of the screen lens provided in step one for which the user wishes to view.

2. The method of discretely viewing a split screen of claim 1 whereby the plurality of eye glasses provided in the fifth step further comprises a means of visually discerning which pair of eye glasses matches which of the polarized fields of the screen lens and further comprising an additional step inserted between the fifth and sixth steps whereby the user utilizes the means of visually discerning which pair of eye glasses matches which of the polarized fields of the screen lens such that the user thereby matches a desired pair of eye glasses with a particular field the user wishes to view.

* * * * *